US011673219B2

United States Patent
Liu

(10) Patent No.: US 11,673,219 B2
(45) Date of Patent: Jun. 13, 2023

(54) SPINDLE UNIT

(71) Applicant: DISCO CORPORATION, Tokyo (JP)

(72) Inventor: Naili Liu, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 349 days.

(21) Appl. No.: 16/941,836

(22) Filed: Jul. 29, 2020

(65) Prior Publication Data

US 2021/0039213 A1 Feb. 11, 2021

(30) Foreign Application Priority Data

Aug. 6, 2019 (JP) .............................. JP2019-144400

(51) Int. Cl.
| | | |
|---|---|---|
| *B23Q 11/08* | (2006.01) | |
| *B23Q 1/70* | (2006.01) | |
| *B24B 55/00* | (2006.01) | |
| *B24B 41/04* | (2006.01) | |
| *F16C 32/06* | (2006.01) | |
| *B23Q 11/12* | (2006.01) | |

(52) U.S. Cl.
CPC ............ *B23Q 11/0883* (2013.01); *B23Q 1/70* (2013.01); *B24B 41/04* (2013.01); *B24B 55/00* (2013.01); *F16C 32/06* (2013.01); *B23Q 11/127* (2013.01)

(58) Field of Classification Search
CPC ................................ B24B 41/04; B24B 55/00
USPC .......................... 451/177, 246, 259, 385, 450
See application file for complete search history.

(56) References Cited

U.S. PATENT DOCUMENTS

| | | | | |
|---|---|---|---|---|
| 2007/0206890 | A1* | 9/2007 | Kim | F16C 33/745 384/119 |
| 2008/0057836 | A1* | 3/2008 | Polyak | B24B 53/017 257/E21.244 |
| 2009/0011688 | A1* | 1/2009 | Schafer | B24B 13/06 451/256 |
| 2013/0183890 | A1* | 7/2013 | Akahane | B24B 7/228 451/259 |
| 2013/0316624 | A1* | 11/2013 | Diehl | B24B 41/04 451/450 |

FOREIGN PATENT DOCUMENTS

| | | | |
|---|---|---|---|
| JP | 2017222003 A | 12/2017 | |
| JP | 201812149 | * 1/2018 | ............. B24B 55/04 |

* cited by examiner

*Primary Examiner* — Joel D Crandall
*Assistant Examiner* — Shantese L McDonald
(74) *Attorney, Agent, or Firm* — Greer Burns & Crain Ltd.

(57) ABSTRACT

A sealing portion on a lower end of a cover portion of a spindle cover has an upper side surface and a lower side surface that are inclined toward an outer circumferential surface of a spindle. A larger-diameter disk and the outer circumferential surface of the spindle define therebetween a second gap that is narrower than a first gap defined between the spindle and the cover portion. The second gap is effective to prevent a processing waste liquid from entering between the spindle and the spindle cover to prevent a solid waste contained in the processing waste liquid from sticking to the spindle. The spindle is thus prevented from becoming less liable to rotate smoothly due to solid waste deposits.

4 Claims, 4 Drawing Sheets

SPINDLE UNIT

BACKGROUND OF THE INVENTION

Field of the Invention

The present invention relates to a spindle unit.

Description of the Related Art

A grinding apparatus grinds a workpiece held on a chuck table with grinding stones while supplying a grinding fluid to the workpiece. The grinding stones are arrayed in an annular pattern on a base, making up a grinding wheel. The grinding wheel is mounted on a mount of a spindle unit and rotates at a high speed during operation.

The spindle unit includes a spindle, the mount coupled to the lower end of the spindle, a casing supporting a side surface of the spindle with an air bearing, and an electric motor for rotating the spindle about its own axis.

When the workpiece is ground by the grinding wheel, a grinding fluid is supplied to the workpiece, and hence a grinding waste liquid containing a solid waste such as swarf is produced on the workpiece. The spindle unit includes a cover covering the side surface of the spindle for preventing the grinding waste liquid from being applied to the side surface of the spindle. The cover is disposed between the lower end of the casing and an upper surface of the mount. A gap between an inner surface of the cover and the side surface of the spindle acts as a discharge channel for discharging air from the air bearing. The discharge channel has a lower end positioned at a lower portion of the spindle and providing a discharge port.

SUMMARY OF THE INVENTION

When the air bearing stops being supplied with air, air stops being discharged from the discharge port. Consequently, the grinding waste liquid may enter the gap between the spindle and the cover. If the grinding waste liquid has entered the gap, the grinding waste liquid tends to be dried, allowing the solid waste contained therein to stick to the side surface of the spindle and the inner surface of the cover until it fills the gap and makes the spindle less liable to rotate smoothly.

Japanese Patent Laid-open No. 2017-222003 discloses a spindle unit where a cover can be disassembled and cleaned. However, since the cover needs to be disassembled, cleaned, and assembled again, the whole process for cleaning the cover is time-consuming and inefficient.

It is therefore an object of the present invention to provide a spindle unit that is capable of preventing the spindle from becoming less liable to rotate smoothly due to a solid waste such as swarf.

In accordance with an aspect of the present invention, there is provided a spindle unit including a spindle having a distal end coupled to a mount for mounting a processing tool, a casing surrounding an outer circumferential surface of the spindle, the spindle being rotatably supported by an air bearing in the casing, and a spindle cover surrounding the spindle between a lower end of the casing and the mount, in which the spindle cover includes a cover portion having an inner circumferential surface facing the outer circumferential surface of the spindle, the inner circumferential surface of the cover portion and the outer circumferential surface of the spindle defining a first gap therebetween, and a sealing portion integrally formed with the cover portion at a lower end of the cover portion and having an inner oblique surface inclined toward the outer circumferential surface of the spindle, and the sealing portion and the outer circumferential surface of the spindle define therebetween a second gap that is narrower than the first gap for preventing a solid waste from being dried and deposited on the outer circumferential surface of the spindle.

In the spindle unit, the sealing portion at the lower end of the cover portion of the spindle cover has the inner oblique surface inclined toward the outer circumferential surface of the spindle. The inner oblique surface defines between the sealing portion and the outer circumferential surface of the spindle the second gap that is narrower than the first gap defined between the spindle and the cover portion.

As described above, the spindle unit has a narrower gap, i.e., the second gap, at the lower end of the gap, i.e., the first gap, between the spindle and the spindle cover. The second gap is effective to prevent a grinding waste liquid containing a solid waste from entering the first gap.

Therefore, the spindle unit is able to effectively prevent the solid waste contained in the grinding waste liquid from being dried and deposited on the outer circumferential surface of the spindle between the spindle and the spindle cover. The spindle is thus prevented from becoming less liable to rotate smoothly.

The inner oblique surface on a lower end portion of the spindle cover partly reduces the gap between the spindle and the spindle cover. In other words, the narrower second gap, which is of a small axial length in the directions, i.e., the vertical directions, along which the spindle extends, is defined between the spindle and the spindle cover by the inner oblique surface on the lower end portion of the spindle cover.

The narrower second gap is of an annular shape around the spindle and has the small axial length in the vertical directions, i.e., is of a linear shape. The second gap is effective to prevent the grinding waste liquid from finding its way therethrough into the first gap.

As the axial length of the second gap is small, any solid waste that may have been dried and deposited in the second gap is small in quantity. Accordingly, the spindle is prevented from becoming less liable to rotate smoothly due to the solid waste that may have collected in the second gap. In addition, inasmuch as any solid waste that may have collected in the second gap is small in quantity, the collected solid waste can easily be removed, e.g., expelled away, when the spindle is rotated about its own axis. The need to clean the spindle cover to get rid of collected solid waste is thus reduced.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
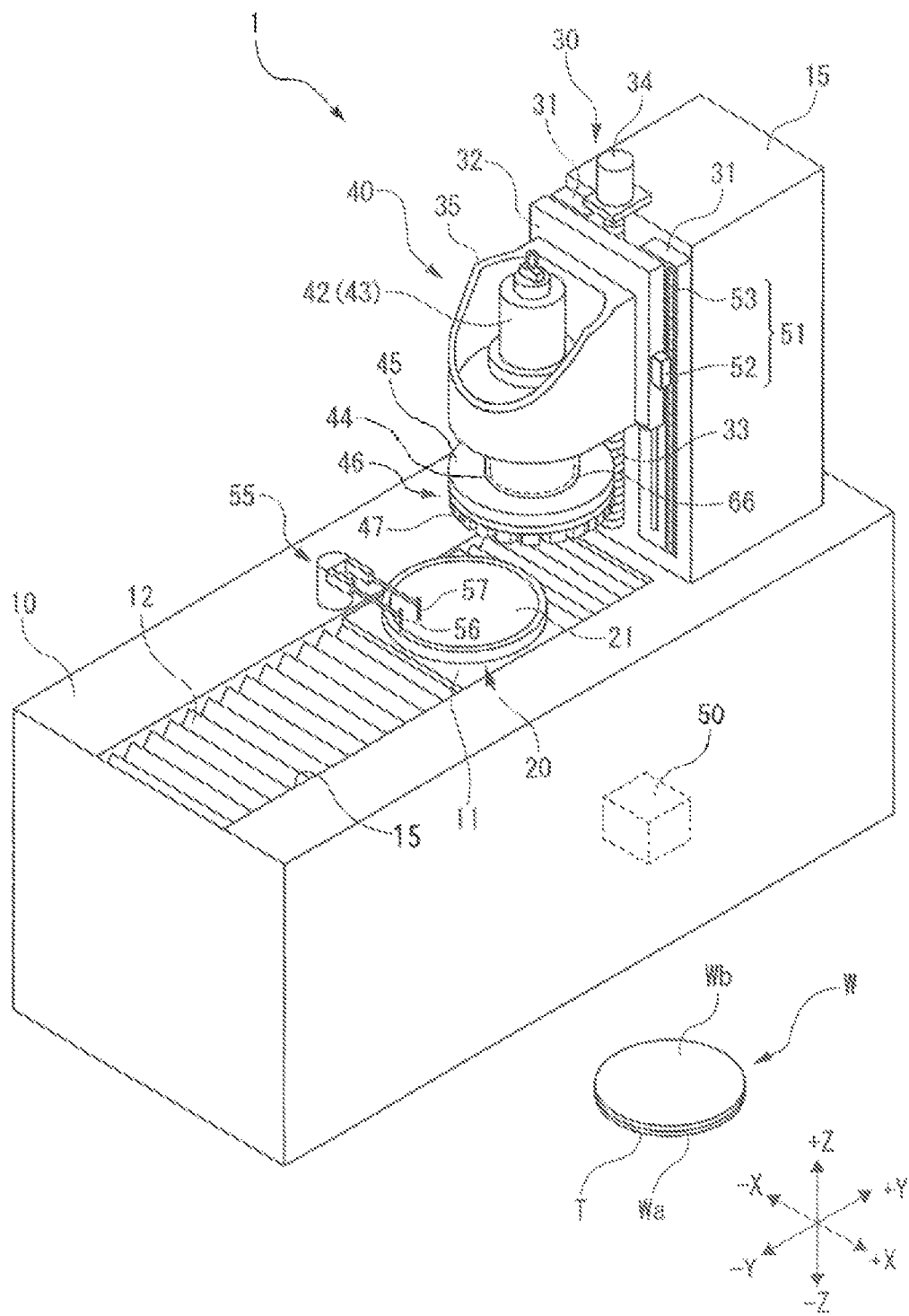
FIG. 1 is a perspective view of a grinding apparatus incorporating a spindle unit according to an embodiment of the present invention.

A grinding apparatus 1 illustrated in FIG. 1 is an apparatus for grinding a wafer W as a workpiece. As illustrated in FIG. 1, the wafer W is a circular semiconductor wafer, for example. The wafer W has a face side Wa with a plurality of devices, not illustrated, formed thereon. In FIG. 1, the face side Wa of the wafer W faces downwardly and is protected by a protective tape T affixed thereto. The wafer W has a reverse side Wb opposite the face side Wa and facing upwardly. The reverse side Wb represents a surface to be worked on, i.e., to be ground by the grinding apparatus 1.

The grinding apparatus 1 includes a base 10 extending in Y-axis directions and a column 15 erected on the base 10 at an end portion thereof in a+Y direction that is one of the Y-axis directions. The base 10 has a rectangular opening 15 defined therein that is open upwardly in an upper surface of the base 10 and that extends in the Y-axis directions. The opening 15 is covered with a movable plate 11 and a bellows-like wafer-resistant cover 12.

A chuck table 20 extends through and is disposed on the movable plate 11. The chuck table 20 is a table shaped as a circular plate for holding the wafer W thereon and has a holding surface 21. The holding surface 21 includes a porous material. With the wafer W placed on the holding surface 21, a suction force produced by a suction source, not illustrated, is transmitted to and acts on the holding surface 21, holding the wafer W under suction on the holding surface 21.

The wafer-resistant cover 12 is extensibly and contractibly coupled to the movable plate 11. When the wafer W is ground, the chuck table 20 and the movable plate 11 are reciprocably moved in unison with each other in the Y-axis directions by a Y-axis moving mechanism, not illustrated, housed in the base 10. The wafer-resistant cover 12 is extended and contracted in the Y-axis directions as the movable plate 11 moves reciprocably in the Y-axis directions.

The column 15 on the base 10 supports, on its front surface, a grinding unit 40 for grinding the wafer W and a grinding feed mechanism 30 for moving the grinding unit 40 in Z-axis directions, as grinding feed directions, perpendicular to the Y-axis directions.

The grinding feed mechanism 30 includes a pair of guide rails 31 extending parallel to the Z-axis directions, a movable table 32 slidable on the guide rails 31, a ball screw 33 extending parallel to the guide rails 31, an electric motor 34, and a holder 35 mounted on a front surface, i.e., a face side, of the movable table 32. The holder 35 holds the grinding unit 40 thereon.

The movable table 32 is slidably disposed on the guide rails 31. A nut, not illustrated, is fixed to a rear surface, i.e., a reverse side, of the movable table 32 and threaded over the ball screw 33. The electric motor 34 is connected to an end of the ball screw 33.

When the electric motor 34 is energized, it rotates the ball screw 33 about its own axis, causing the nut to move the movable table 32 in one of the Z-axis directions along the guide rails 31. The holder 35 mounted on the movable table 32 and the grinding unit 40 held on the holder 35 are moved in unison with the movable table 32 in the one of the Z-axis directions.

The grinding unit 40 includes a spindle unit 42, a mount 45 mounted on a distal end, i.e., a lower end, of the spindle unit 42, and a grinding wheel 46 having grinding stones 47.

The spindle unit 42 is what is called an air spindle unit. The spindle unit 42 includes a casing 43, a spindle 44 supported in the casing 43, and a spindle cover 66 covering a lower end portion of the spindle 44.

A thickness measuring unit 55 is disposed on the base 10 at a position adjacent to the chuck table 20. The thickness measuring unit 55 measures the thickness of the wafer W on the chuck table 20 by contacting the wafer W while the wafer W is being ground by the grinding unit 40. Specifically, the thickness measuring unit 55 includes a pair of probes 56 and 57 for contacting the holding surface 21 of the chuck table 20 and the reverse side Wb of the wafer W, respectively. While the probes 56 and 57 are contacting the holding surface 21 of the chuck table 20 and the reverse side Wb of the wafer W, the thickness measuring unit 55 determines the height of the holding surface 21 of the chuck table 20 and the height of the reverse side Wb of the wafer W, and measures the thickness of the wafer W on the basis of the difference between the determined heights.

A linear scale 51 for measuring the height or vertical position of the grinding unit 40 is disposed on the column 15. The linear scale 51 includes a reader 52 mounted on the movable plate 32 for movement therewith in the Z-axis directions, and a scale member 53 mounted on the surface of one of the guide rails 31. When the reader 52 reads the graduations of the scale member 53, the linear scale 51 measures the height or vertical position of the grinding unit 40.

The grinding apparatus 1 includes a control unit 50 for controlling the various components of the grinding apparatus 1. The control unit 50 controls the various components of the grinding apparatus 1 to process, i.e., grind, the wafer W as desired by the operator of the grinding apparatus 1.

Next, the spindle unit 42 according to the present embodiment will be described in detail below.

Figure 2:
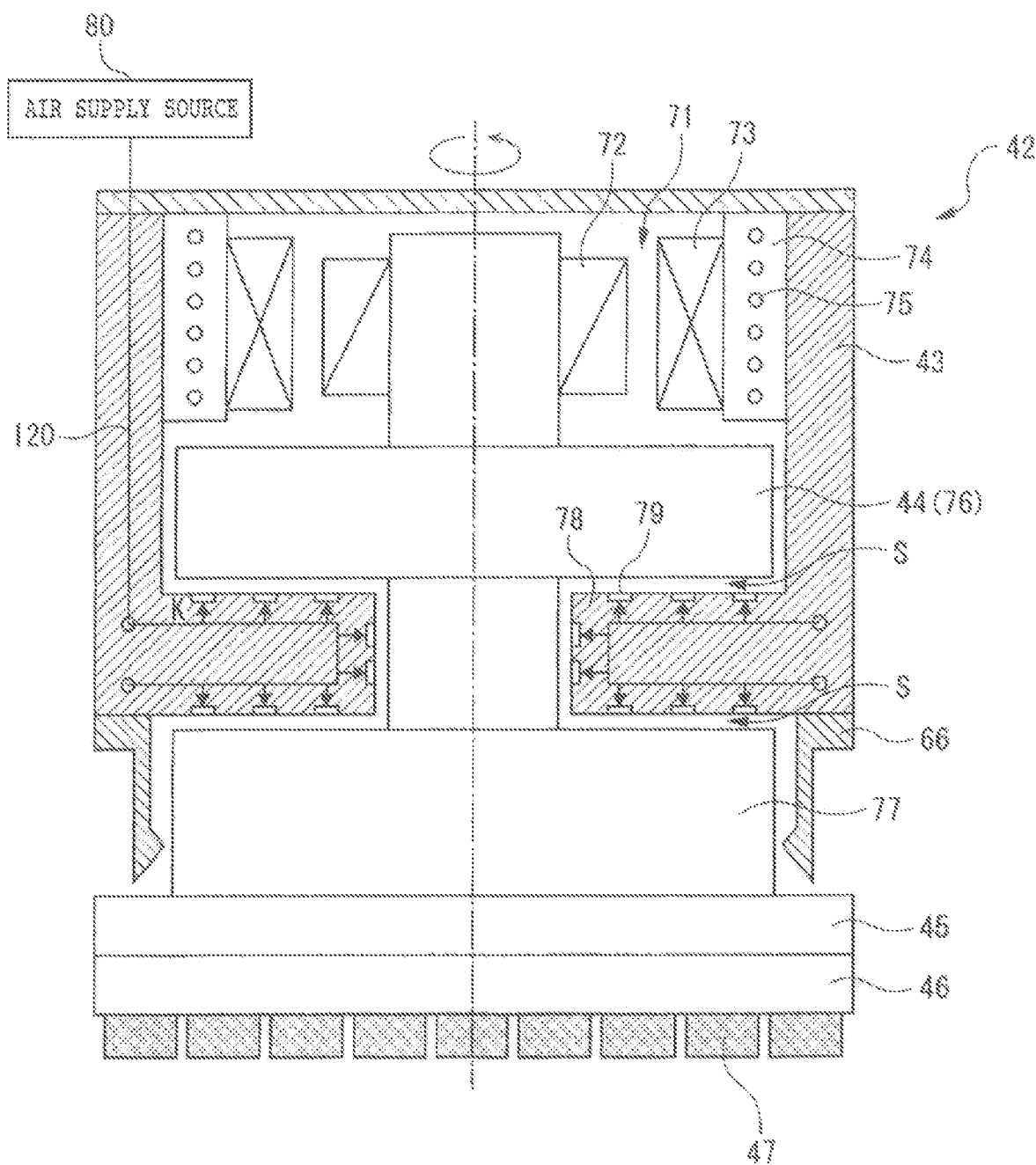
FIG. 2 is an enlarged cross-sectional view of the spindle unit.

As illustrated in FIG. 2, the spindle unit 42 includes the spindle 44 disposed in an upright posture, the casing 43 covering and supporting the spindle 44, the spindle cover 66 covering the lower end portion of the spindle 44, and an electric motor 71 for rotating the spindle 44 about its own axis.

The spindle 44 extends in the Z-axis directions, i.e., heightwise directions. The spindle 44 has a larger-diameter disk 76 disposed on an intermediate portion thereof, and has also a larger-diameter disk 77 disposed on a lower end portion thereof.

The electric motor 71 is coupled to an upper end portion of the spindle 44. The electric motor 71 includes a rotor 72 mounted on the upper end portion of the spindle 44 and a stator 73 disposed around the rotor 72. The stator 73 is mounted on an inner circumferential surface of the casing 43 with a water-cooled jacket 74 interposed therebetween. The water-cooled jacket 74 has a number of cooling water passages 75 defined therein for cooling the electric motor 71 with water flowing through the cooling water passages 75.

The mount 45 is mounted on a distal end, i.e., a lower end, of the spindle 44, i.e., a lower end of the larger-diameter disk 77.

The grinding wheel 46 as a processing tool is mounted on a lower surface of the mount 45. The grinding stones 47 are disposed in an annular array on a lower surface of the grinding wheel 46. The grinding stones 47 are made of abrasive grains of diamond bound together by a binder such as a metal bond, or a resin bond, for example. The grinding stones 47 grind the reverse side Wb of the wafer W held on the chuck table 20 (see FIG. 1).

As illustrated in FIG. 2, the casing 43 surrounds an outer circumferential surface of the spindle 44, which is rotatably supported by an air bearing, to be described later, in the casing 43. The casing 43 includes an annular portion 78 on a lower end portion thereof. The annular portion 78 extends radially inwardly from the casing 43 between the larger-diameter disks 76 and 77 of the spindle 44 with small clearances S defined between the larger-diameter disks 76 and 77 and the annular portion 78.

The casing 43 has an air supply channel 120 and a plurality of air ejection ports 79 defined therein. The air supply channel 120 is connected to an air supply source 80 outside of the spindle unit 42 and extends in the casing 43 including the annular portion 78. The air ejection ports 79 are defined in the annular portion 78 in facing relation to the larger-diameter disks 76 and 77 of the spindle 44, and are connected to the air supply channel 120.

The spindle cover 66 is mounted on a lower end of the casing 43. The spindle cover 66 is disposed between the lower end of the casing 43 and an upper end of the mount 45. The spindle cover 66 surrounds the larger-diameter disk 77 on the lower end portion of the spindle 44 that projects downwardly from the lower end of the casing 43. The spindle cover 66 has a lower end spaced from the mount 45.

Figure 3:
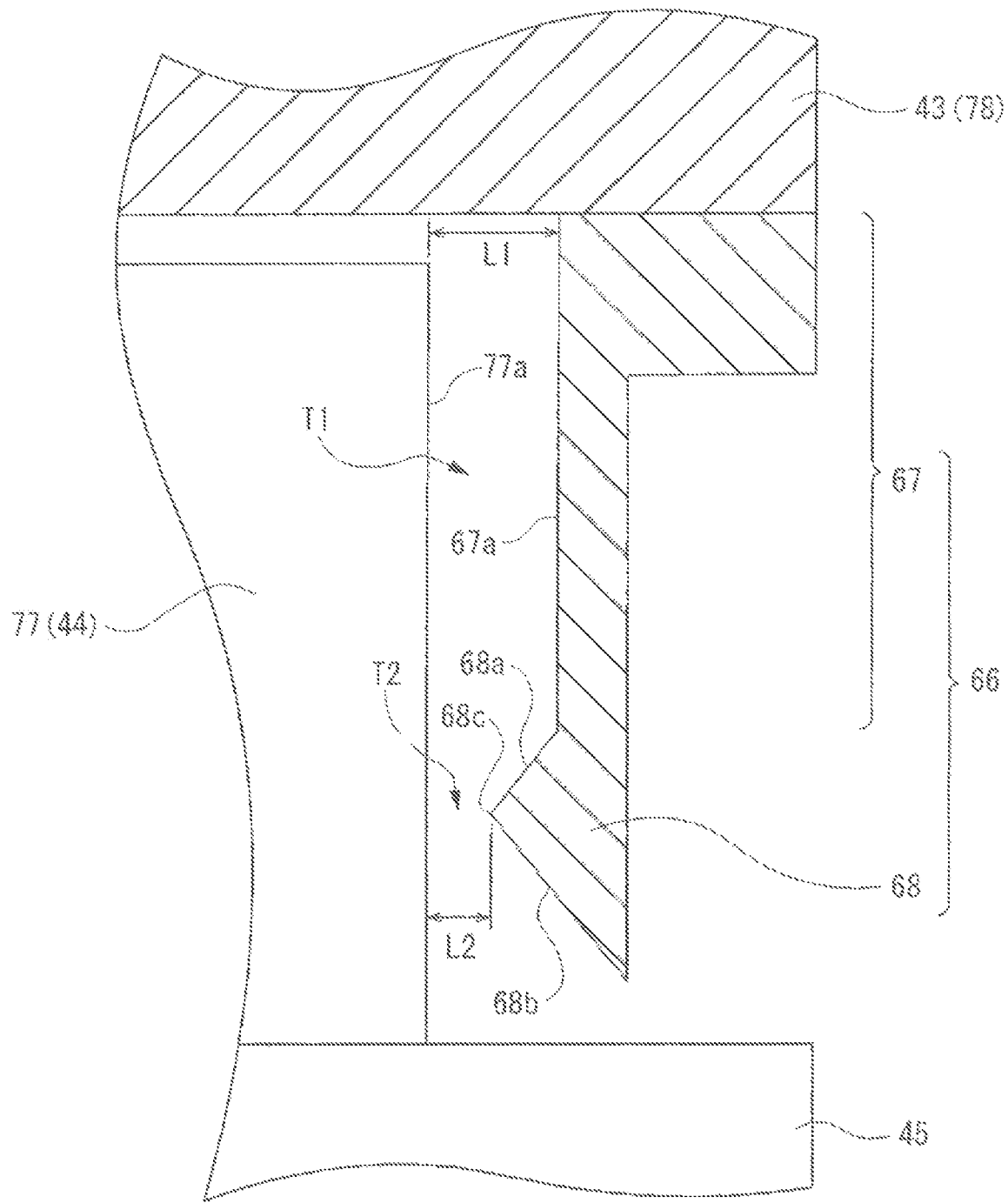
FIG. 3 is an enlarged fragmentary cross-sectional view of a spindle cover of the spindle unit.

As illustrated in FIG. 3, the spindle cover 66 has a cover portion 67 as an upper portion mounted on the casing 43 and a sealing portion 68 integrally formed with the cover portion 67 on a lower end thereof.

The cover portion 67 is of a generally hollow cylindrical shape having an inner circumferential surface 67a, and covers a peripheral region around an outer circumferential surface 77a of the larger-diameter disk 77 of the spindle 44 substantially parallel to the outer circumferential surface 77a. The inner circumferential surface 67a of the cover portion 67 faces the outer circumferential surface 77a of the larger-diameter disk 77 of the spindle 44. A first gap T1 having a width L1 is defined between the inner circumferential surface 67a of the cover portion 67 and the outer circumferential surface 77a of the larger-diameter disk 77. The width L1 of the first gap T1 is as large as 3.5 mm, for example.

The sealing portion 68 is a generally ring-shaped portion having a substantially triangular cross-sectional shape having an upper side surface 68a and a lower side surface 68b. The upper side surface 68a is a slanted surface that is inclined downwardly from the inner circumferential surface 67a of the cover portion 67 toward the outer circumferential surface 77a of the larger-diameter disk 77. The lower side surface 68b is disposed at the lower end of the spindle cover 66. The lower side surface 68b is a slanted surface inclined upwardly from the lower end of the spindle cover 66 toward the outer circumferential surface 77a of the larger-diameter disk 77. The upper side surface 68a and the lower side surface 68b represent an example of inner oblique surfaces inclined toward the outer circumferential surface 77a, i.e., so as to be closer to the outer circumferential surface 77a.

The upper side surface 68a and the lower side surface 68b join each other at a vertex 68c of the sealing portion 68. The sealing portion 68, i.e., the vertex 68c between the upper side surface 68a and the lower side surface 68b is spaced from the outer circumferential surface 77a of the larger-diameter disk 77 by a second gap T2 having a width L2 that is smaller than the width L1 of the first gap T1, e.g., is as large as 0.5 mm.

The grinding apparatus 1 thus constructed rotates the spindle 44 of the spindle unit 42 to grind the wafer W on the chuck table 20 with the grinding stones 47 of the grinding wheel 46 that rotates in unison with the spindle 44 (see FIG. 1).

When the grinding apparatus 1 grinds the wafer W, in the spindle unit 42, the air ejection ports 79 illustrated in FIG. 2 eject air under high pressure into the clearances S between the larger-diameter disks 76 and 77 of the spindle 44 and the annular portion 78 of the casing 43, as indicated by the arrow K. Since the high-pressure air is ejected toward outer surfaces of the spindle 44, including outer surfaces of the larger-diameter disks 76 and 77, the spindle 44 is floatingly supported in the casing 43 by the air. In other words, the spindle 44 is rotatably supported in the casing 43 out of contact therewith by the ejected air. The ejected air thus functions as the air bearing referred to above.

The air ejected into the clearances S is discharged upwardly from the spindle unit 42 while cooling the electric motor 71, and is also discharged from the lower end of the spindle cover 66 on the lower end of the casing 43, i.e., from between the spindle 44, i.e., the larger-diameter disk 77, and the spindle cover 66.

While the workpiece W is being ground by the grinding unit 40, a grinding fluid is supplied from a grinding fluid supply source, not illustrated, through a fluid channel defined in the spindle 44, for example, to the wafer W on the chuck table 20. Therefore, during the grinding process, a grinding waste liquid containing a solid waste such as swarf is produced on the wafer W.

With the spindle unit 42 according to the present embodiment, as illustrated in FIG. 3, the sealing portion 68 on the lower end of the cover portion 67 of the spindle cover 66 includes the upper side surface 68a inclined downwardly toward the outer circumferential surface 77a of the larger-diameter disk 77 of the spindle 44 and the lower side surface 68b inclined upwardly toward the outer circumferential surface 77a. The second gap T2 is defined between the sealing portion 68, i.e., the vertex 68c between the upper side surface 68a and the lower side surface 68b, and the outer circumferential surface 77a of the larger-diameter disk 77. The second gap T2 is narrower than the first gap T1 between the inner circumferential surface 67a of the cover portion 67 and the outer circumferential surface 77a of the larger-diameter disk 77.

According to the present embodiment, as described above, the second gap T2 that is narrower than the first gap T1 is defined between the spindle 44 and the spindle cover 66 at the lower end of the first gap T1.

Consequently, regardless whether air is discharged from between the spindle 44 and the spindle cover 66 at the lower end of the first gap T1 or not, the narrower second gap T2 prevents the grinding waste liquid that contains the solid waste from entering between the spindle 44 and the spindle cover 66.

According to the present embodiment, therefore, the solid waste contained in the grinding waste liquid is effectively prevented from sticking to, i.e., being dried and deposited on, the outer circumferential surface 77a of the larger-diameter disk 77 between the spindle 44 and the spindle cover 66. The spindle 44 is thus prevented from becoming less liable to rotate smoothly due to the solid waste.

According to the present embodiment, the upper side surface 68a and the lower side surface 68b on the lower end portion of the spindle cover 66 partly reduce the gap between the spindle 44 and the spindle cover 66. In other words, the narrower second gap T2, which is of a small axial length in the directions, i.e., the vertical directions, along which the spindle 44 extends, is defined between the spindle 44 and the spindle cover 66 by the upper side surface 68a and the lower side surface 68b on the lower end portion of the spindle cover 66. The narrower second gap T2 is of an annular shape around the larger-diameter disk 77 and has the small axial length in the vertical directions. The second gap T2 is effective to prevent the grinding waste liquid from finding its way therethrough into the first gap T1.

As the axial length of the second gap T2 is small, any solid waste that may have been dried and deposited in the second gap T2 is small in quantity. Accordingly, the spindle 44 is prevented from becoming less liable to rotate smoothly due to the solid waste that may have collected in the second gap T2. In addition, inasmuch as any solid waste that may have collected in the second gap T2 is small in quantity, the collected solid waste can easily be removed, e.g., expelled away, when the spindle 44 is rotated about its own axis. The need to clean the spindle cover 66 to get rid of collected solid waste is thus reduced.

According to the present embodiment, the width L1 of the first gap T1 between the spindle 44, i.e., the larger-diameter disk 77, and the cover portion 67 of the spindle cover 66 should preferably be relatively large to prevent the polishing waste liquid from moving upwardly in the first gap T1 due to capillary action.

The polishing apparatus 1 according to the present embodiment is not limited to the structural details illustrated in FIG. 1. The present invention may be applied to a fully automatic processing apparatus for fully automatically carrying out a series of processes including a process of unloading a wafer out of a cassette and loading a wafer into the cassette, a process of grinding a wafer, a process of polishing a wafer, and a process of cleaning a wafer, for example.

The spindle unit 42 according to the present embodiment is also applicable to a polishing apparatus. In a case where the spindle unit 42 is applied to a polishing apparatus, the spindle unit 42 has a polishing pad in place of the grinding wheel 46.

Figure 4:
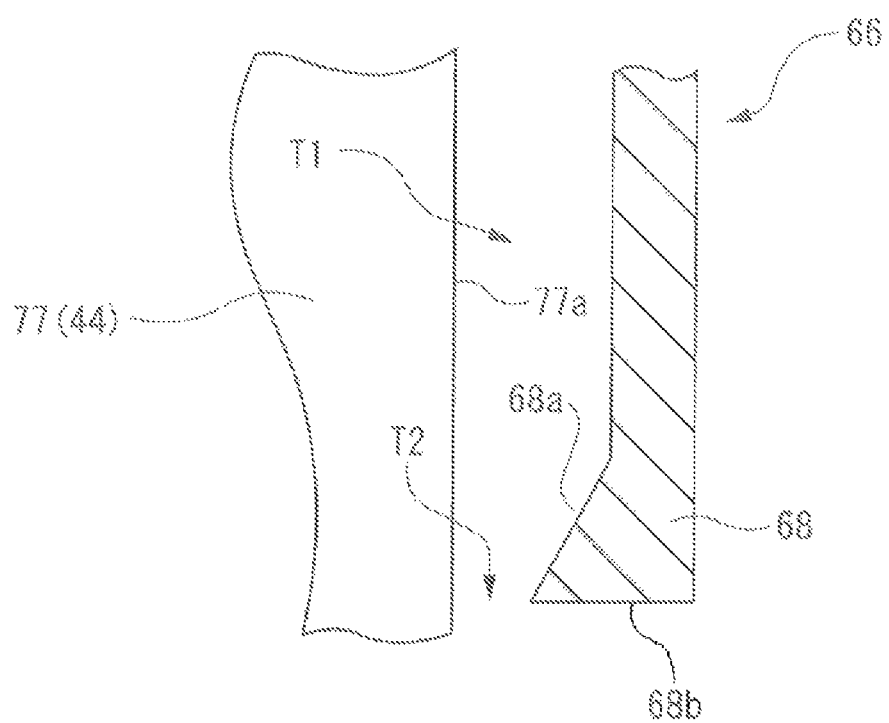
FIG. 4 is an enlarged fragmentary cross-sectional view of a modification of the spindle cover.

According to the present embodiment, as illustrated in FIG. 3, the lower side surface 68b of the sealing portion 68 of the spindle cover 66 is a surface inclined upwardly toward the outer circumferential surface 77a of the larger-diameter disk 77 of the spindle 44. However, as illustrated in FIG. 4, the lower side surface 68b may be a surface extending toward the outer circumferential surface 77a of the larger-diameter disk 77 substantially perpendicularly thereto. The component also define the narrower second gap T2 between the spindle 44 and the spindle cover 66.

Stated otherwise, according to the present embodiment, only either one of the upper side surface 68a and the lower side surface 68b of the sealing portion 68 may be a slanted surface, i.e., an inner oblique surface, inclined toward the outer circumferential surface 77a of the larger-diameter disk 77 of the spindle 44. The upper side surface 68a and the lower side surface 68b thus configured define the narrower second gap T2 between the spindle 44 and the spindle cover 66.

However, the upper side surface 68a of the sealing portion 68 should preferably be inclined downwardly toward the outer circumferential surface 77a of the larger-diameter disk 77, rather than extending substantially perpendicularly to the outer circumferential surface 77a. The upper side surface 68a thus inclined makes it easy to discharge out a grinding waste liquid or the like that may have happened to enter between the spindle 44 and the spindle cover 66, i.e., the first gap T1 therebetween.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A spindle unit comprising:
   a spindle having a distal end coupled to a mount for mounting a processing tool;
   a casing surrounding an outer circumferential surface of the spindle, the spindle being rotatably supported by an air bearing in the casing; and
   a spindle cover surrounding the spindle between a lower end of the casing and the mount, wherein the spindle cover includes:
      a cover portion having an inner circumferential surface facing the outer circumferential surface of the spindle, the inner circumferential surface of the cover portion and the outer circumferential surface of the spindle defining a first gap therebetween, and
      a sealing portion integrally formed with the cover portion at a lower end of the cover portion and having a first inner oblique surface inclined toward the outer circumferential surface of the spindle, and
   the sealing portion and the outer circumferential surface of the spindle define therebetween a second gap that is narrower than the first gap for preventing a solid waste from being dried and deposited on the outer circumferential surface of the spindle, wherein a clearance between the spindle on the one side and the casing and the spindle cover on the other side forms a channel filled exclusively with air from the air bearing which discharges partially through the second gap, wherein the channel includes both the first gap and the second gap.

2. The spindle unit of claim 1, wherein the first inner oblique surface forms a lower side surface of the sealing portion, such that the lower side surface is non-perpendicular with the outer circumferential portion of the spindle.

3. The spindle unit of claim 1, wherein the first inner oblique surface forms a lower side surface of the sealing portion, such that the lower side surface is oblique with respect to an axis of rotation of the spindle.

4. The spindle unit of claim 1, wherein the sealing portion further comprises a second inner oblique surface and a vertex where the first inner oblique surface and the second inner oblique surface join, wherein the first inner oblique surface and the second inner oblique surface are inclined in opposite directions.

* * * * *